US012643094B2

United States Patent
(12) United States Patent
Abate et al.

(10) Patent No.: US 12,643,094 B2
(45) Date of Patent: Jun. 2, 2026

(54) METHOD FOR RAPID AND LARGE-SCALE GENERATION OF DROPLETS AND DROPLET LIBRARIES

(71) Applicant: The Regents of the University of California, Oakland, CA (US)

(72) Inventors: Adam R. Abate, San Francisco, CA (US); Jesse Qiuxu Zhang, San Francisco, CA (US); Leqian Liu, San Francisco, CA (US); Cyrille L. Delley, San Francisco, CA (US); Russell Cole, San Francisco, CA (US); Christian Siltanen, San Francisco, CA (US); Ata Dolatmoradi, San Jose, CA (US)

(73) Assignee: The Regents of the University of California, Oakland, CA (US)

( * ) Notice: Subject to any disclaimer, the term of this patent is extended or adjusted under 35 U.S.C. 154(b) by 576 days.

(21) Appl. No.: 18/027,298

(22) PCT Filed: Sep. 28, 2021

(86) PCT No.: PCT/US2021/052438

§ 371 (c)(1),
(2) Date: Mar. 20, 2023

(87) PCT Pub. No.: WO2022/072363

PCT Pub. Date: Apr. 7, 2022

(65) Prior Publication Data

US 2024/0042425 A1 Feb. 8, 2024

Related U.S. Application Data

(60) Provisional application No. 63/084,690, filed on Sep. 29, 2020.

(51) Int. Cl.
*B01L 3/02* (2006.01)

(52) U.S. Cl.
CPC ..... *B01L 3/0268* (2013.01); *B01L 2400/0436* (2013.01); *B01L 2400/0439* (2013.01)

(58) Field of Classification Search
CPC ........... B01L 3/0268; B01L 2400/0436; B01L 2400/0439; B01L 7/52; B01L 2200/0673
See application file for complete search history.

(56) References Cited

U.S. PATENT DOCUMENTS 10,161,007 B2 * 12/2018 Abate ................. B01F 33/3031
2003/0080143 A1 5/2003 Kale et al.
(Continued)

FOREIGN PATENT DOCUMENTS

WO WO 2001/028701 4/2001
WO WO 2007/024800 3/2007
(Continued)

OTHER PUBLICATIONS

Brouzes et al. (2009) "Droplet microfluidic technology for single-cell high-throughput screening" Proceedings of the National Academy of Sciences of the United States of America 106:34, 14195-14200.
(Continued)

*Primary Examiner* — Jennifer Wecker
*Assistant Examiner* — Steven Ray Castaneda
(74) *Attorney, Agent, or Firm* — Edward J. Baba; Christian S. Hans; Bozicevic, Field & Francis LLP

(57) ABSTRACT

Provided is a method of generating droplets that includes aspirating a first liquid into a tube, positioning the tube over a receiving liquid, and ejecting the first liquid to generate a plurality of droplets that contact the receiving liquid and remain discrete even after contacting the receiving liquid. Whereas many other droplet generators require complex microfluidics, the present methods allow generation of droplets without the need for microfluidics. The methods can be
(Continued)

performed with existing commercially available macro-fluidic liquid handling devices. The methods can be used for digital PCR, digital MDA, enzyme screening, single cell analysis, and other applications involving droplets.

19 Claims, 9 Drawing Sheets

(56) References Cited

U.S. PATENT DOCUMENTS

| | | | | |
|---|---|---|---|---|
| 2013/0090248 | A1* | 4/2013 | Link | C12Q 1/686 506/9 |
| 2015/0056663 | A1* | 2/2015 | Tajima | B01F 31/445 435/297.1 |
| 2016/0068899 | A1* | 3/2016 | Blainey | C12Q 1/6851 435/6.12 |
| 2020/0086312 | A1* | 3/2020 | Hiddessen | B01L 3/50273 |

FOREIGN PATENT DOCUMENTS

| | | |
|---|---|---|
| WO | WO 2011/120020 | 9/2011 |
| WO | WO 2014/154501 | 10/2014 |
| WO | WO 2018/119301 | 6/2018 |

OTHER PUBLICATIONS

Fox et al. (2017) "Picoliter-volume inkjet printing into planar microdevice reservoirs for low-waste, high-capacity drug loading" Bioengineering & Translational Medicine 2:1 9-16.

Hatori et al. (2018) "Particle-Templated Emulsification for Microfluidics-Free Digital Biology" Analytical Chemistry 90:16 9813-9820.

Hindson et al. (2011) "High-throughput droplet digital PCR system for absolute quantitation of DNA copy number" Analytical Chemistry 83:22 8604-8610.

Jeong et al. (2015) "Kilo-scale droplet generation in three-dimensional monolithic elastomer device (3D Med)" Lab on a Chip 15:23 4387-4392.

Ji et al. (2011) "Integrated parallel microfluidic device for simultaneous preparation of multiplex optical-encoded microbeads with distinct quantum dot barcodes" Journal of Materials Chemistry 21:35 13380-13387.

Kaminski et al. (2012) "Automated generation of libraries of nL droplets" Lab on a Chip 12:20, 3995-4002.

Kirk et al. (2011) "Multiplexed inkjet functionalization of silicon photonic biosensors" Lab on a Chip 11:7, 1372-1377.

Kulesa et al. (2018) "Combinatorial drug discovery in nanoliter droplets" Proceedings of the National Academy of Sciences of the United States of America 115:26 6685-6690.

Li et al. (2008) "Simultaneous generation of droplets with different dimensions in parallel integrated microfluidic droplet generators" Soft Matter 4:2 258.

Longwell et al. (2020) "micrIO: an open-source autosampler and fraction collector for automated microfluidic input-output" Lab on a Chip 20:1 93-106.

Maaten et al. (2008) "Visualizing Data using t-SNE" Journal of Machine Learning Research 2579-2605.

Macosko et al. (2015) "Highly parallel genome-wide expression profiling of individual cells using nanoliter droplets" Cell 161:5 1202-1214.

Majumdar et al. (2017) "Poisson Plus Quantification for Digital PCR Systems" Scientific Reports 7:1 1-10.

Matuła et al. (2020) "Single-Cell Analysis Using Droplet Microfluidics" Advanced Biosystems 4:1 1900188.

Pellegrino et al. (2018) "High-throughput single-cell DNA sequencing of acute myeloid leukemia tumors with droplet microfluidics" Genome Research 28:9 1345-1352.

Periyannan et al. (2017) "Multiple pathogen biomarker detection using an encoded bead array in droplet PCR" Journal of Microbiological Methods 139 22-28.

Pinheiro et al. (2012) "Evaluation of a droplet digital polymerase chain reaction format for DNA copy number quantification" Analytical Chemistry 84:2 1003-1011.

Romero et al. (2014) "Dissecting enzyme function with microfluidic-based deep mutational scanning".

Sjostrom et al. (2014) "High-throughput screening for industrial enzyme production hosts by droplet microfluidics" Lab on a Chip 14:4 806-813.

Tang et al. (2016) "One-step immunoassay of C-reactive protein using droplet microfluidics" Lab on a Chip 16:22 4359-4365.

Zhang et al. (1997) "Drop formation in viscous flows at a vertical tube" Physics of Fluids 9: 2234.

Zheng et al. (2017) "Massively parallel digital transcriptional profiling of single cells" Nature Communications 8:1 1-12.

* cited by examiner

A

E

F

METHOD FOR RAPID AND LARGE-SCALE GENERATION OF DROPLETS AND DROPLET LIBRARIES

CROSS-REFERENCE

This application is a 371 of PCT/US2021/052438 filed Sep. 28, 2021, which claims the benefit of U.S. Provisional Patent Application No. 63/084,690 filed Sep. 29, 2020, which are incorporated herein by reference.

GOVERNMENT RIGHTS

This invention was made with government support under grant no. AR068129 and R01 HG008978 awarded by The National Institutes of Health. The government has certain rights in the invention.

INTRODUCTION

Microfluidic droplets are a valuable technology with applications in many fields of biotechnology. For example, single cell analysis involves characterizing the genome of each cell from a sample individually, instead of determining the average genome of many cells. This can be an important step for diagnosing and treating cancer. Droplets help perform single cell analysis because each cancer cell can be placed into its own droplet. Since the environment inside each droplet is isolated from the other droplets, each single cancer cell can be sequenced separately, such as through polymerase chain reaction (PCR) or multiple displacement amplification (MDA). Droplets have many other biotechnology applications, such as enzyme screening.

Droplets are commonly generated with microfluidic devices. However, these microfluidic devices suffer from a number of disadvantages including cost, complexity, difficulty of maintenance, requirement for technical expertise, and speed.

SUMMARY

Provided is a method of generating droplets that includes aspirating a first liquid into a tube, positioning the tube over a receiving liquid, and ejecting the first liquid to generate a plurality of droplets that contact the receiving liquid and remain discrete even after contacting the receiving liquid. Whereas many other droplet generators require complex microfluidics, the present methods allow generation of droplets without the need for microfluidics. The methods can be performed with existing commercially available macrofluidic liquid handling devices. The methods can be used for digital PCR, digital MDA, enzyme screening, single cell analysis, and other applications involving droplets.

DETAILED DESCRIPTION

Figure 1:
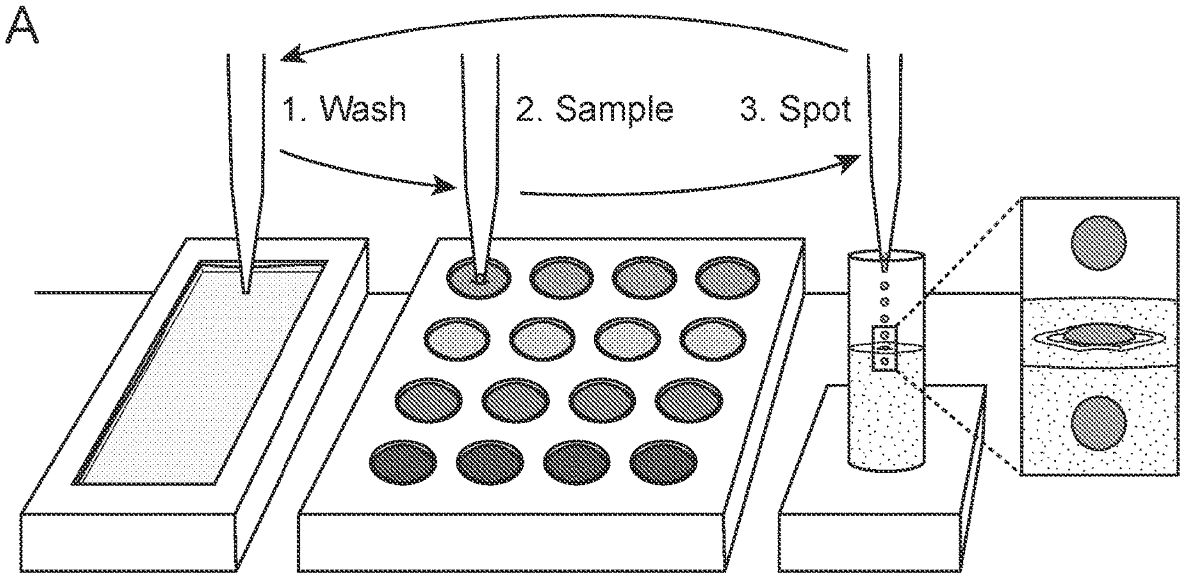
FIG. 1 shows automated liquid handling and dispensing with commercial drop in air printer for generation of monodisperse droplet libraries. (A) Each sample is emulsified by operating the printer's tube nozzle in a three-step cycle. 1. The nozzle moves to the wash tray and the previous contents in the nozzle are ejected; 2. The nozzle moves to the sample plate and suctions several microliters of sample; 3. The nozzle moves to the oil bath and ejects droplets into an oil bath, after which it moves to the wash tray. (B) Droplet libraries generated in this fashion are monodisperse and analogous to those generated by a microfluidic device. Scale bar=200 μm.
Figure 1:
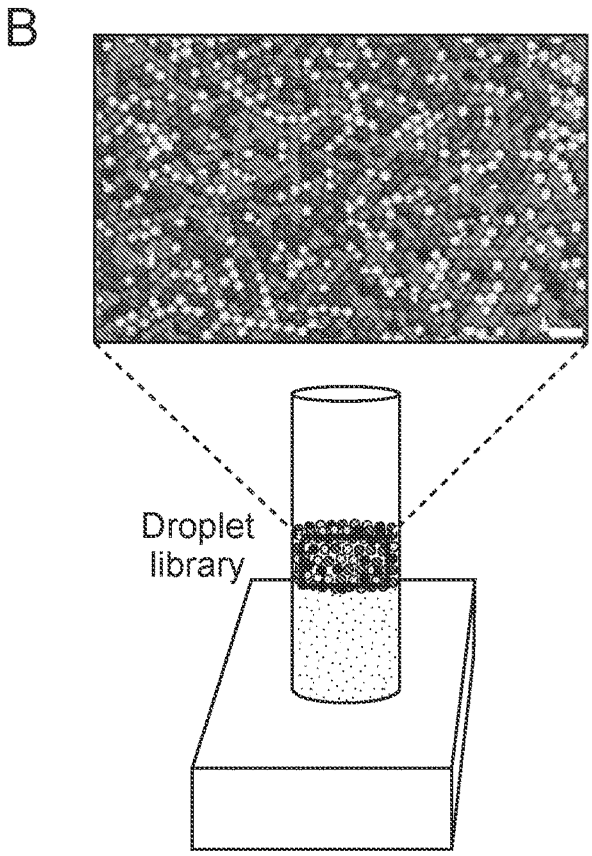

Provided is a method of generating droplets that includes aspirating a first liquid into a tube, positioning the tube over a receiving liquid, and ejecting the first liquid to generate a plurality of droplets that contact the receiving liquid and remain discrete even after contacting the receiving liquid. Whereas many other droplet generators require complex microfluidics, the present methods allow generation of droplets without the need for microfluidics. The methods can be performed with existing commercially available macrofluidic liquid handling devices. The methods can be used for digital PCR, digital MDA, enzyme screening, single cell analysis, and other applications involving droplets.

Before the present invention is described in greater detail, it is to be understood that this invention is not limited to particular embodiments described, as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" include plural referents unless the context clearly dictates otherwise. Thus, for example, reference to "a droplet" includes a plurality of such droplets and reference to "the discrete entity" includes reference to one or more discrete entities, and so forth.

It is further noted that the claims may be drafted to exclude any element, e.g., any optional element. As such, this statement is intended to serve as antecedent basis for use of such exclusive terminology as "solely", "only" and the like in connection with the recitation of claim elements, or the use of a "negative" limitation.

The publications discussed herein are provided solely for their disclosure prior to the filing date of the present application. Further, the dates of publication provided may be different from the actual publication dates which may need to be independently confirmed. To the extent the definition or usage of any term herein conflicts with a definition or usage of a term in an application or reference incorporated by reference herein, the instant application shall control.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Methods

Provided is a method of generating droplets. These droplets can also be considered as microfluidic droplets or discrete entities. The method can include an aspiration step, a positioning step, and an ejection step.

During the aspiration step, a first liquid can be aspirated into a lumen of a tube through an opening in the tube. As used herein, the term "tube" refers to an element that includes at least one lumen and at least one opening that fluidically connects the lumen to space outside the tube. In some cases the tube has a circular cross section and an elongated shape, such as common laboratory pipettes that are plastic and compressible. However, the tube can have any dimensions and any shape as long as it includes at least one lumen and at least one opening that fluidically connects the lumen to space outside the tube. For example, the tube can be shaped like a cube, the lumen can be shaped like a cube, and the opening can be located on one face of the cube. In other cases, the tube has an irregular shape. The "tube" can also be referred to as a "container" since it can be considered to contain material inside of its lumen.

The term "lumen" refers to a space inside of a solid element, e.g. a space inside the tube. Lumen is used interchangeably herein with cavity and hollow. The term "opening" is used interchangeably herein with hole and nozzle. The opening can have any shape, e.g. circular, square, or rectangular. The opening can occupy the entire cross-section of the tube, or it can occupy less than the entire cross-section. In some cases the tube becomes wider or narrower along its length, i.e. it changes cross section.

In some cases, the lumen is only fluidically connected to the outside environment through the opening. In other words, there is only a single opening that connects the lumen to the outside environment. In such cases, the opening can be considered a "blind hole". The "outside environment" is the space outside of the tube. In other cases, there are two or more openings that each fluidically connect the lumen to the outside environment, and each opening can be considered a "through hole".

"Aspirating liquid into the tube" is used interchangeably with "drawing liquid into the tube" and "sucking liquid into the tube". "Aspiration force" is used interchangeably with "suction force" and "vacuum force".

The positioning step involves "positioning the opening over a receiving liquid". This terminology includes each of the embodiments described in this paragraph. First, the positioning can involve moving the tube while keeping the receiving liquid stationary, moving the receiving liquid while keeping the tube stationary, or moving both the tube and the receiving liquid. Moving the receiving liquid involves moving a container holding the receiving liquid. Next, by positioning the opening "over" the receiving liquid, the opening can be positioned within a gas that is above the receiving liquid or positioning the opening submerged in the receiving liquid. If positioning the opening within a gas, the generated droplets fall through the gas before contacting the receiving liquid. In cases wherein the opening is positioned submerged within the receiving liquid, the generated droplets will contact the receiving liquid upon exiting the opening. Pressure inside the lumen of the tube can be used to prevent the receiving liquid from entering the lumen.

During the ejection step, the liquid inside the tube is ejected, i.e. expelled, from the same opening that it was previously aspirated into. In other words, the aspirating step and ejecting step involve moving the liquid through the same opening but in opposite directions. The ejection force can be created in any suitable manner, and this is sometimes achieved using the same way that the aspiration force was created. For example, the liquid can be aspirated with a piezo-electric element, and then ejected with the piezo-electric element. The moving part that generates the force can, but does not have to, be in physical contact the liquid. In other words, the forces can either be exerted by a solid moving element itself, or by gas pressure inside the tube. The force causing the ejection can be referred as an ejection force or an expulsion force.

The ejection is also performed in a manner that separates the single volume of liquid inside the lumen into multiple droplets, i.e. into multiple separate volumes. In other words, the ejected liquid is ejected as multiple discrete droplets, and not as a continuous stream. The ejection force can be either constant or oscillating. For example, a slowly leaking kitchen faucet applying constant water pressure can sometimes generate discrete water droplets instead of a continuous stream of water. If the force is an oscillating force, each oscillation typically corresponds to the generation of a single droplet.

If the opening is positioned within a gas during the droplet formation, such as normal room air, the droplet is initially formed at a gas-liquid interface. In contrast, known microfluidic devices form a droplet when two different liquids are directed towards one another in a microfluidic channel. Thus, typical microfluidic devices form a droplet at a liquid-liquid interface. Since the liquid is aspirated and ejected through the same opening in the tube, the method does not rely on passage of the liquid through a microfluidic channel or junction to generate the droplets. Instead, the droplets are generated as the liquid is ejected from the opening in the tube. Framed in another manner, whereas microfluidic systems typically generate droplets by applying a force to and moving two distinct liquids simultaneously, the present method involves applying a force and moving only a single liquid at a time. After ejection, a newly formed droplet will fall towards the receiving liquid due to gravity and the force of ejection. After contacting the receiving liquid, due to the nature of the droplet and the receiving liquid, the droplet will remain distinct and will not merge with the receiving liquid. For example, the droplet can be an aqueous droplet that comprises water, whereas the receiving liquid can comprise a hydrophobic oil. In other words, the first liquid and the receiving liquid can be considered as immiscible. The presence of the droplet of a first liquid in the receiving liquid can also be considered to be an emulsion.

If the opening is positioned submerged in the receiving liquid, the droplets form at a liquid-liquid interface. However, whereas known microfluidic devices involve the flow of two liquids both through microfluidic channels, the present method involves flowing a first liquid directly into a reservoir containing the receiving liquid.

The receiving liquid does not merely receive the droplets, but also helps them remain discrete. In other words, if multiple droplets were simply deposited onto a solid surface, they might merge with one another. However, the receiving liquid surrounds each droplet of first liquid, thereby helping prevent the droplets from merging with one another.

The receiving liquid can comprise a surfactant that helps the droplet remain discrete and avoid merging with the receiving liquid. An exemplary surfactant is a fluorosurfactant, such as in 0.5% w/v or more. In some cases, the first liquid comprises a surfactant. In some cases, both the first liquid and the receiving liquid comprise a surfactant.

In addition, the ejecting step sometimes involves generating a plurality of droplets, and not just a single droplet. Hence, multiple droplets will contact the receiving liquid. Depending on the relative densities of the first liquid and the receiving liquid, the droplets will either float towards to the top of the receiving liquid, sink towards the bottom of the receiving liquid, or disperse evenly throughout the receiving liquid. Although the droplets might contact one another in the receiving liquid, usually the droplets will not merge or coalesce with one another. Even if merging does occur with some droplets, most droplets usually remain discrete. In totality, this results in numerous discrete droplets that can be considered as a droplet library. These droplets can be collected and then employed in a further application, as discussed below.

Thus, the method can include aspirating a first liquid into a tube through an opening, positioning the opening over a receiving liquid, and ejecting the first liquid from the opening to generate a first plurality that contact the receiving liquid, remain discrete, and do not merge.

Mechanical Features

The tube is sometimes part of a liquid handling device. An exemplary commercially available device that can be used with the method is the SciFlexArrayer S3 (Scienion AG), used with either a PDC40, PDC70, or PDCX tube nozzle. The aspiration force, i.e. the suction force, that aspirates the liquid can be generated in any suitable manner, such as by a pump inside the device that reduces the atmospheric pressure inside the tube. This can also be referred to as creating a vacuum force, even if only a partial vacuum is created. In some cases the aspiration force is created by a piezo-electric element that exerts a mechanical force in response to electricity. The mechanical force can cause motion of a solid element, thereby changing the volume of the lumen and creating an aspiration force.

In some cases, the tube is positioned vertically, with the opening directed downwards, when the liquid is aspirated. In such cases, the opening can be considered to be located on a bottom surface of the tube. The opening can be inserted below the surface of the liquid, and then the aspiration force can be applied, aspirating the desired volume of liquid.

Each of the liquids described herein can be contained in standard well-plates or other containers known in the art. The well-plate can have 10 or more wells, such as 100 or more, 1,000 or more, or 10,000 or more. For example, each liquid to be aspirated can be located within a well of a well plate, e.g. as shown in FIG. 1. The washing liquid can be located in a single reservoir. In some cases the aspirated washing liquid is expelled into the same washing reservoir, and not into a separate waste container. The receiving liquid can be contained in, for example, a glass vial or beaker.

Any suitable type of mechanical configuration can be used to generate the droplets. In other words, various mechanical configurations can be used to the aspiration, positioning, and ejecting. For example, the tube can be part of a piezo-electric droplet generator. In some cases the droplet generator can have a configuration similar or identical to those described in U.S. Provisional Patent Application 62/949,147, which is incorporated herein by reference. An exemplary commercially available device that can be used with the method is the SciFlexArrayer S3 (Scienion AG), used with either a PDC40, PDC70, or PDCX tube nozzle.

Figure 2:
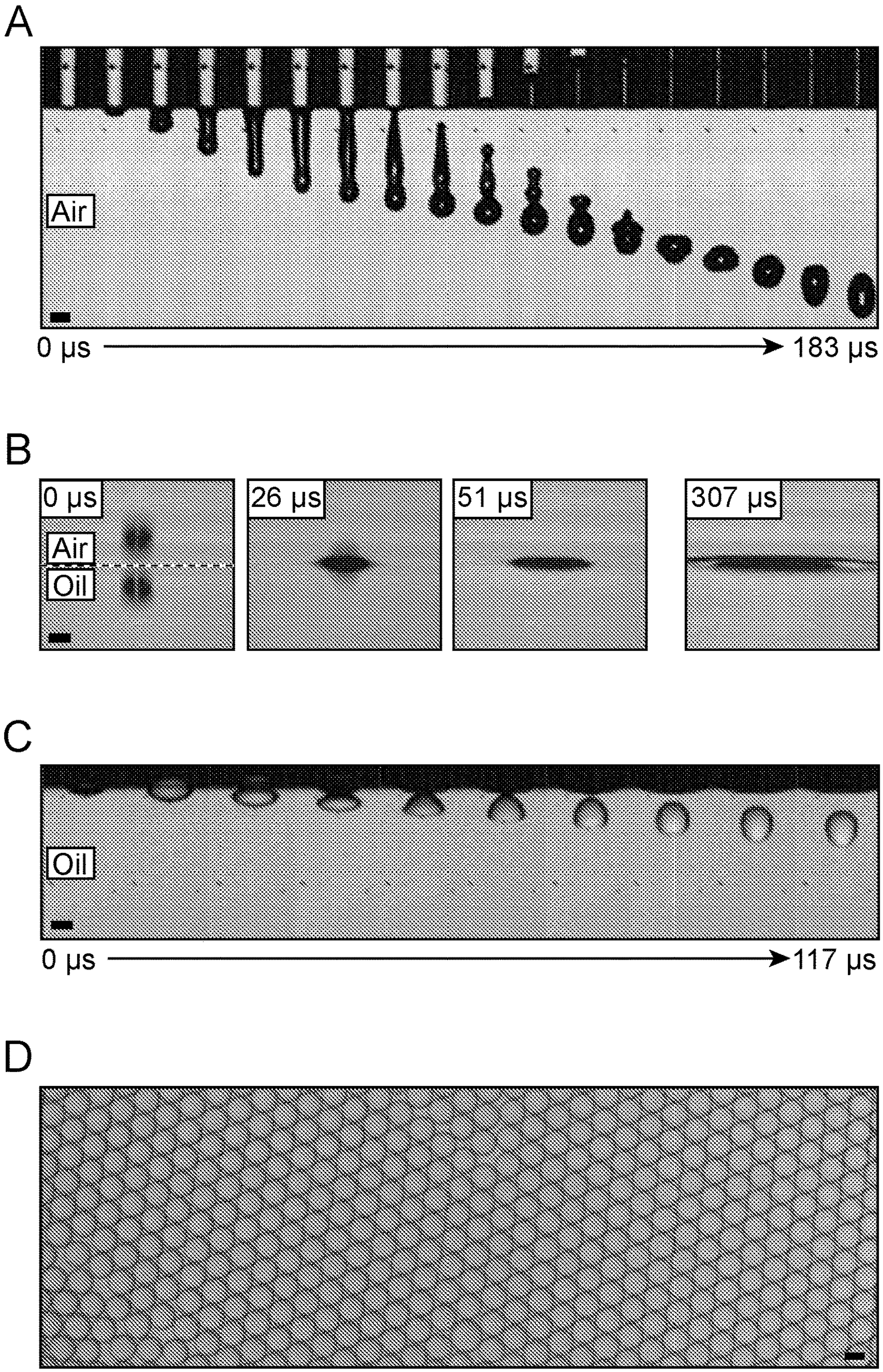
FIG. 2 shows drop-in-air printing into oil is rapid, reliable, and tunable. (A) Time-lapse imagery of the droplet being ejected from the tube into air by acoustic waves. (B) Impact of droplet into the oil layer. (C) Behavior of the droplet once it pierces the oil layer. (D) Micrograph of droplets generated at 300 Hz. (E) Droplet size distribution as a function of acoustic wave frequency (left), voltage (center), and pulse width (right). All scale bars 50 μm.
Figure 2:
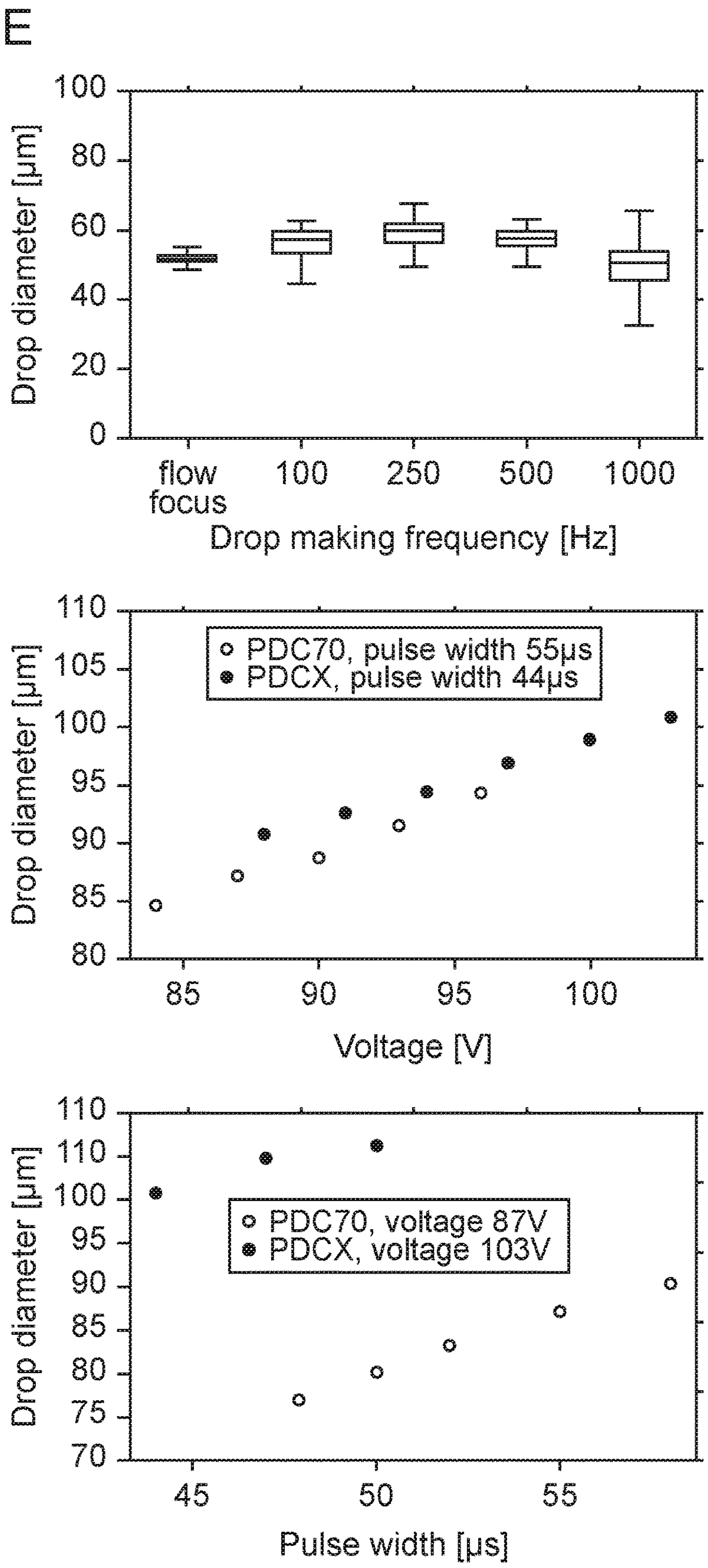

Sometimes the ejection involves a piezo-electric device that delivers piezo-electric driven pressure pulses (FIG. 2, panel A). In some cases, initially, the tube can be filled to the tip with the dispensing liquid; when the pulse is applied, a droplet bulges from the tip and detaches. The remaining liquid retracts up the tube before refilling and coming to rest at the tip, where the cycle can repeat.

Repeating the Method

The method can include repeating the aspiration, positioning, and ejecting steps.

Typically, these repetitions are separated from one another by washing the tube with a washing liquid. The washing step usually involves aspirating a washing fluid from a washing fluid reservoir, positioning the opening over a waste receptacle, and ejecting the washing fluid into the waste receptacle. The washing fluid typically includes the same solvent as the first fluid, e.g. water, and sometimes includes a detergent. In other cases the washing fluid simply contains the solvent of the first fluid. In some cases, this washing step is skipped.

As such, the method can include: aspirating a first liquid, positioning, ejecting the first liquid to form first droplets, washing the tube, aspirating a second liquid, positioning, and ejecting the second liquid to form second droplets.

In some cases, the second sequence of aspirating, positioning, and ejecting is performed with the same liquid as the first sequence. In such cases the washing step is typically omitted. For example, if a certain number of droplets of the first liquid are desired, but the tube lacks the volume to generate the desired number of droplets with a single aspiration, then the steps can be repeated at least once more with the same liquid.

In other cases, the subsequent aspirating, positioning, and ejecting is performed with a different liquid from the first sequence. The aspirating, positioning, and ejecting steps can be repeated for a total of 2 or more liquids, such as 5 or more, 10 or more, 25 or more, 50 or more, 100 or more, 500 or more, or 2,000 or more.

Additional steps can be performed that help prevent the droplets from merging with one another after contacting the receiving liquid. It has been found that stirring or agitating the receiving liquid during the ejecting step helps disperse the droplets throughout the receiving liquid, and helps prevent a buildup of droplets at the location where the droplets contact the receiving liquid. In other words, since less droplets are present at the location of droplet contact, new droplets have more time to interact with the receiving liquid and form into stable droplets before coming in contact with existing droplets, thereby reducing the chance that two droplets will merge.

Optional Features

The method can include agitating, e.g. stirring, the receiving liquid during the ejecting. It has been found that stirring or otherwise agitating the receiving liquid during the ejecting step helps disperse the droplets throughout the receiving liquid, and helps prevent a buildup of droplets at the location where the droplets contact the receiving liquid. In other words, since less droplets are present at the location of droplet contact, new droplets have more time to interact with the receiving liquid and form into stable droplets before coming in contact with existing droplets, thereby reducing the chance that two droplets will merge.

Barcodes, fluorescent tags, and labeled beads can also be used to track the contents of each particular droplet. The method can further include fluorescently tagging the generated droplets. The method can further include barcoding the generated droplets. The method can be used to make DNA-encoded libraries and massively multiplexed PCR. The method can also be used to make chemical libraries, protein libraries, and cell libraries.

Numerical Aspects

One advantage of the present method is rapid generation of droplets. In some cases, the droplets are generated at a rate of 10 Hz or more, such as 50 Hz or more, 100 Hz or more, or 500 Hz or more.

In some cases, a total of 100 or more droplets are generated, such as 1,000 or more, 10,000 or more, or 100,000 or more. Each droplet typically has a volume ranging from 1 pl to 10,000 pl, such as 10 pl to 2,000 pl, 50 pl to 1,000 pl, or 100 pl to 500 pl. In some cases, 80% or more of the droplets have a volume within a range recited above, such as 90% or more or 95% or more. In addition, the droplets typically have similar volumes to one another. In other words, they are typically monodispersed. For instance, 90% or more of the droplets have a volume that is within 20% of the median droplet volume, such as 95% or more within 10%. In some cases, 50% or more of the droplets generated remain discrete, such as 75% or more, 90% or more, or 95% or more. Each of these parameters can be combined in any suitable combination. For example, in some cases 1,000 droplets are generated and 95% or more of such droplets have a volume ranging from 50 pl to 1,000 pl, wherein 90% or more of the droplets have a volume within 20% of the median droplet volume.

In some cases, the aspiration step includes aspirating 0.05 μl or more of liquid into the tube, such as 0.1 μl, 0.5 μl, 1 μl, or 5 μl.

The total volume of droplets produced can be, for example, 10 μl/hr to 10,000 μl/hr, such as 50 μl/hr to 1,000 μl/hr or 100 μl/hr to 500 μl/hr. The method can be performed continuously, i.e. without stopping, for 1 hour or more, such as 5 hours or more. The method can be performed automatically without human intervention for 1 hour or more, such as 5 hours or more.

The opening of the tube sometimes has a cross-sectional area of 50 $mm^2$ or less or less, such as 10 $mm^2$ or less, or 1 $mm^2$ or less.

In some cases, each liquid is present in a well plate before being aspirated. In some cases, the pool of liquid being aspirated from has a volume of 50 μl or more, such as 100 μl or more, 500 μl or more, 1 ml or more, or 5 ml or more.

Biotechnology and Chemical Applications

In addition to simply making the droplets, the method can also include performing chemical or biotechnological analysis on contents of the droplets. Such applications include, for example, PCR, MDA, single cell analysis, and enzyme screening. For the nucleic acids described in this section, sometimes they are double-stranded and sometimes they are single-stranded.

In some cases, the application is PCR. In such cases, the first liquid comprises a nucleic acid and a polymerase chain reaction (PCR) reagent, further comprising incubating a first droplet under conditions effective for the formation of a PCR amplification product from the nucleic acid, wherein the method is a method of performing digital PCR. The PCR reagent can be, for example, a PCR primer or a PCR polymerase. In other words, the nucleic acid and PCR reagent are combined with one another before being encapsulated into a droplet.

In other cases, the nucleic acid and PCR reagent are encapsulated into separate droplets, and then combined afterwards. In some cases, first liquid comprises a nucleic acid and the second liquid comprises a PCR reagent, further comprising merging a first droplet with a second droplet and incubating the combined droplet under conditions effective for the formation of a PCR amplification product from the nucleic acid, wherein the method is a method of performing digital PCR.

In some cases, the method further comprising repeating the digital PCR on ten nucleic acids present in ten different liquids. In some cases, the PCR reagent is a barcoded or fluorescently labelled primer. In some cases, the method further comprises moving a droplet into a PCR tube.

In some cases, the application is MDA. In such cases, the first liquid comprises a nucleic acid and a multiple displacement amplification (MDA) reagent, further comprising incubating a first droplet under conditions effective for the formation of a MDA amplification product from the nucleic acid, wherein the method is a method of performing digital PCR. The MDA reagent can be, for example, a MDA primer or a MDA polymerase. In other words, the nucleic acid and MDA reagent are combined with one another before being encapsulated into a droplet.

In other cases, the nucleic acid and MDA reagent are encapsulated into separate droplets, and then combined afterwards. In some cases, first liquid comprises a nucleic acid and the second liquid comprises a MDA reagent, further comprising merging a first droplet with a second droplet and incubating the combined droplet under conditions effective for the formation of a MDA amplification product from the nucleic acid, wherein the method is a method of performing digital MDA.

In some cases, the method further comprising repeating the digital MDA on ten nucleic acids present in ten different liquids. In some cases, the MDA reagent is a barcoded or fluorescently labelled primer.

The application can also be enzyme screening. In enzyme screening, scientists typically make a large library of different enzymes by making numerous different modifications to the generic code that corresponds to the enzyme. Scientists typically seek to discover an enzyme with advantages over the existing enzyme, such as more selectivity for a certain substrate or more selectivity for the substrate and less selectivity for other substrates.

In such cases, the first liquid comprises a substrate and an enzyme hypothesized to be able to metabolize the substrate, further comprising incubating the first plurality of droplets under conditions hypothesized to be effective for metabolism of the substrate, wherein the method is a method of enzyme screening. Alternatively, the first liquid comprises a substrate and the second liquid comprises an enzyme hypothesized to be able to metabolize the substrate, further comprising merging a first droplet with a second droplet and incubating the combined droplet under conditions hypothesized to be effective for metabolism of the substrate, wherein the method is a method of enzyme screening. In some cases, the method includes repeating the enzyme screening for 10 or more enzymes, such as 100 or more or 1,000 or more.

Single cell analysis is another possible application. Exemplary types of analysis include genomic analysis, transcriptome analysis, proteomic analysis, and metabolomic analysis. The method can include repeating the analysis on 10 or more single cells in 10 or more droplets, such as 100 or more or 1,000 or more.

In some cases of single cell analysis, the first liquid comprises a single cell analysis reagent, wherein the first liquid further comprises a single cell and a lysing reagent or contents from a single lysed cell, further comprising incubating the first plurality of droplets under conditions effective for single cell analysis, wherein the method is a method of single cell analysis. Alternatively, the first liquid comprises a single cell analysis reagent, wherein the second liquid comprises a single cell and a lysing reagent or contents from a single lysed cell, further comprising merging a first droplet and a second droplet and incubating the combined droplet under conditions effective for single cell analysis, wherein the method is a method of single cell analysis.

Each of the liquids to be aspirated can be located in a well of multi-well plate, i.e. a multi-well chip. For single cell analysis, a single cell can be located in each well. As such, the method can also include positioning a single cell in a well of a multi-well plate along with a first liquid, optionally performing additional biochemical steps, and then beginning with the aspiration. For example, the biochemical steps can include cell lysis, applying a dye, or staining the cell.

In other cases, the application is related to drug screening, drug discovery, and combinatorial chemistry. In some cases this application is DNA-encoded chemical library (DEL) analysis. In DEL analysis, a building block of a drug candidate or a full drug candidate is conjugated to a DNA fragment that acts as an identifying barcode. The interaction between the drug candidate and its target can be assessed based on the DNA barcode. This barcoding can also be performed with any suitable oligomers, and not only DNA.

In such cases, the first liquid sometimes comprises an oligomer conjugated to piece of a drug candidate or a whole drug candidate. These drug candidates are small molecules that are hypothesized to prompt a beneficial biochemical response. In some cases, the oligomer is not conjugated to piece of drug candidate or whole drug candidate, but the elements are all located in the same liquid.

Systems

Also provided are systems for performing the methods described herein. The systems can have any of the features described above regarding the methods.

An exemplary system includes a first liquid in a first container, a receiving liquid in a receiving container, and a liquid handling device. The liquid handling device comprises a tube with an opening, as discussed above. The device is configured to aspirate the first liquid through the opening, position the opening over the receiving liquid, and eject the first fluid to generate droplets that contact the receiving liquid. The nature and chemical composition of the liquids allow the droplets to remain discrete and avoid merging after contacting the receiving liquid.

In order to position the opening over the receiving liquid, one or both of the receiving liquid container and the tube will move. Typically, the receiving liquid container will remain stationary while the tube moves. The liquid handler can have a translatable element that can move in two or three orthogonal directions, which is sometimes referred to as an x-y stage or x-y-z stage mechanism.

As shown in FIG. 1, the liquids to be aspirated can be contained in a multi-well plate, i.e. a multi-well chip. A single liquid can be located in only one well, or the same liquid can be located in two or more wells. For instance, in FIG. 1 each liquid is located in 4 wells and there are 4 different liquids, occupying the full 16 wells. In some cases the tube is washed before the first aspiration. The well-plate can have 10 or more wells, such as 100 or more, 1,000 or more, or 10,000 or more. In some cases, there are multiple liquids that are each located in multiple wells. For instance, a multi-well plate might have 5 wells with a first liquid, 3 wells with a washing liquid, 4 wells with a second liquid, and 8 wells with a third liquid.

In cases where the liquids are barcoded, the multi-well chip can have barcodes printed and attached to the wells. As such, when a single cell or other analyte is introduced into each well, the analyte is barcoded based on the identity of the well.

The system can further include a washing liquid in a washing container, wherein the liquid handling device is configured to wash the tube after the ejecting. The system can also include a second liquid in a second container, wherein the liquid handling device is configured to aspirate and eject the second liquid after washing the tube.

In some cases, each liquid being aspirated and ejected comprises water and the receiving liquid comprises oil. In other cases, each liquid being aspirated and ejected comprises oil and the receiving liquid comprises water. The receiving liquid can include a surfactant, such as a fluorosurfactant. The surfactant can help to keep the droplets discrete. In some cases the receiving liquid includes 0.5% w/v or more of surfactant.

The system can include a shaker or stirrer. Additional steps can be performed that help prevent the droplets from merging with one another after contacting the receiving liquid. It has been found that stirring or agitating the receiving liquid during the ejecting step helps disperse the droplets throughout the receiving liquid, and helps prevent a buildup of droplets at the location where the droplets contact the receiving liquid. In other words, since less droplets are present at the location of droplet contact, new droplets have more time to interact with the receiving liquid and form into stable droplets before coming in contact with existing droplets, thereby reducing the chance that two droplets will merge.

The system can be configured to apply a constant or oscillating force to the liquid in order to eject it such that droplets are formed. The tube can be part of a piezo-electric droplet generator.

The system can be configured to generate droplets at a rate of 10 Hz or more, such as 50 Hz or more, 100 Hz or more, or 500 Hz or more. Each droplet typically has a volume ranging from 1 pl to 10,000 pl, such as 10 pl to 2,000 pl, 50 pl to 1,000 pl, or 100 pl to 500 pl. In some cases, 80% or more of the droplets have a volume within a range recited above, such as 90% or more or 95% or more. In addition, the droplets typically have similar volumes to one another. For instance, 90% or more of the droplets have a diameter that is within 20% of the median droplet volume, such as 95% or more within 10%. Each of these parameters can be combined in any suitable combination. For example, in some cases 1,000 droplets are generated and 95% or more of such droplets have a volume ranging from 50 pl to 1,000 pl, wherein 90% or more of the droplets have a volume within 20% of the median droplet volume.

In some cases, the aspiration step includes aspirating 0.05 μl or more of liquid into the tube, such as 0.1 μl, 0.5 μl, 1 μl, or 5 μl.

The opening of the tube sometimes has a cross-sectional area of 50 $mm^2$ or less or less, such as 10 $mm^2$ or less, or 1 $mm^2$ or less.

In some cases, each liquid is present in a well plate before being aspirated. In some cases, the pool of liquid being aspirated from has a volume of 50 μl or more, such as 100 μl or more, 500 μl or more, 1 ml or more, or 5 ml or more.

In some cases, the system does not have a microfluidic channel.

Notwithstanding the appended claims, the disclosure is also defined by the following clauses:

1. A method of generating droplets, comprising:
   aspirating a first liquid into a lumen of a tube through an opening in the tube;
   positioning the opening over a receiving liquid; and
   ejecting the first liquid from the opening to generate a first plurality of droplets that contacts the receiving liquid,
   wherein the first plurality of droplets remain discrete and do not merge after contacting the receiving liquid.
2. The method of clause 1, further comprising:
   washing the tube with a washing liquid;
   aspirating a second liquid into the tube through the opening;
   positioning the opening over the receiving liquid;
   ejecting the second liquid from the opening to generate a second plurality of droplets that contacts the receiving liquid,
   wherein the second plurality of droplets remain discrete and do not merge after contacting the receiving liquid.
3. The method of clause 2, repeating the aspirating, positioning, and ejecting steps for a total of 5 or more liquids.
4. The method of clause 3, repeating the aspirating, positioning, and ejecting steps for a total of 10 or more liquid.
5. The method of any one of clauses 1-4, wherein each liquid being aspirated and ejected comprises water and the receiving liquid comprises oil.
6. The method of any one of clauses 1-4, wherein each liquid being aspirated and ejected comprises oil and the receiving liquid comprises water.
7. The method of any one of clauses 1-6, wherein the receiving liquid comprises a surfactant.
8. The method of clause 7, wherein the surfactant is a fluorosurfacant.
9. The method of clause 7 or 8, wherein the receiving liquid comprises 0.5% w/v or more of surfactant.
10. The method of any one of clauses 1-9, further comprising stirring or agitating the receiving liquid during each ejecting step.
11. The method of any one of clauses 1-10, wherein the ejecting comprises applying an oscillating force to the ejected liquid, wherein each oscillation corresponds to a single droplet.
12. The method of any one of clauses 1-11, wherein the tube is part of a piezo-electric droplet generator.
13. The method of any one of clauses 1-12, further comprising fluorescently tagging the generated droplets.
14. The method of any one of clauses 1-13, further comprising barcoding the generated droplets.
15. The method of any one of clauses 1-14, wherein the droplets are generated at a rate of 50 Hz or more.
16. The method of clause 15, wherein the droplets are generated at a rate of 500 Hz or more.
17. The method of any one of clauses 1-15, wherein 95% or more of the droplets have a volume ranging from 10 pl to 2,000 pl.
18. The method of clause 17, wherein 95% or more of the droplets have a volume ranging from 50 pl to 1,000 pl.
19. The method of any one of clauses 1-18, wherein a total of 100 or more droplets are generated.
20. The method of clause 19, wherein a total of 10,000 or more droplets are generated.
21. The method of any one of clauses 1-20, wherein the opening of the tube has a cross-sectional area of 100 $mm^2$ or less.
22. The method of any one of clauses 1-21, wherein 50% or more of the droplets do not combine with another droplet after contacting the receiving liquid.
23. The method of clause 22, wherein 90% or more of the droplets do not combine with another droplet after contacting the receiving liquid.

24. The method of any one of clauses 1-23, wherein 90% or more of the droplets have a volume that is within 20% of the median droplet volume.
25. The method of any one of clauses 1-24, wherein each aspirated liquid is present in a well plate before being aspirated.
26. The method of any one of clauses 1-25, wherein each aspiration step comprises aspirating 0.5 μl or more of liquid.
27. The method of any one of clauses 1-26, wherein before being aspirated, the aspirated liquid is part of a pool of liquid having a volume of 100 μl or more.
28. The method of any one of clauses 1-27, wherein the first liquid comprises a nucleic acid and a polymerase chain reaction (PCR) reagent, further comprising incubating a first droplet under conditions effective for the formation of a PCR amplification product from the nucleic acid, wherein the method is a method of performing digital PCR.
29. The method of any one of clauses 1-27, wherein the first liquid comprises a nucleic acid and the second liquid comprises a PCR reagent, further comprising merging a first droplet with a second droplet and incubating the combined droplet under conditions effective for the formation of a PCR amplification product from the nucleic acid, wherein the method is a method of performing digital PCR.
30. The method of any one of clauses 28-29, wherein the nucleic acid is single-stranded.
31. The method of any one of clauses 28-29, wherein the nucleic acid is double-stranded.
32. The method of any one of clauses 28-31, further comprising repeating the digital PCR on ten nucleic acids present in ten different liquids.
33. The method of any one of clauses 28-32, wherein the PCR reagent is a barcoded or fluorescently labelled primer.
34. The method of any one of clauses 1-27, wherein the first liquid comprises a nucleic acid and a multiple displacement amplification (MDA) reagent, further comprising incubating the first plurality of droplets under conditions effective for the formation of MDA amplification products from the nucleic acid, wherein the method is a method of performing digital MDA.
35. The method of any one of clauses 1-27, wherein the first liquid comprises a nucleic acid and the second liquid comprises a MDA reagent, further comprising merging a first droplet with a second droplet and incubating the combined droplet under conditions effective for the formation of MDA amplification products from the nucleic acid, wherein the method is a method of performing digital MDA.
36. The method of any one of clauses 34-35, wherein the nucleic acid is single-stranded.
37. The method of any one of clauses 34-35, wherein the nucleic acid is double-stranded.
38. The method of any one of clauses 34-37, further comprising repeating the digital MDA on ten nucleic acids present in ten different liquids.
39. The method of any one of clauses 34-38, wherein the MDA reagent is a barcoded or fluorescently labelled primer.
40. The method of any one of clauses 1-27, wherein the first liquid comprises a substrate and an enzyme hypothesized to be able to metabolize the substrate, further comprising incubating the first plurality of droplets under conditions hypothesized to be effective for metabolism of the substrate, wherein the method is a method of enzyme screening.
41. The method of any one of clauses 1-27, wherein the first liquid comprises a substrate and the second liquid comprises an enzyme hypothesized to be able to metabolize the substrate, further comprising merging a first droplet with a second droplet and incubating the combined droplet under conditions hypothesized to be effective for metabolism of the substrate, wherein the method is a method of enzyme screening.
42. The method of any one of clauses 40-41, further comprising repeating the enzyme screening on ten or more enzymes.
43. The method of any one of clauses 1-27, wherein the first liquid comprises a single cell analysis reagent, wherein the first liquid further comprises a single cell and a lysing reagent or contents from a single lysed cell, further comprising incubating the first plurality of droplets under conditions effective for single cell analysis, wherein the method is a method of single cell analysis.
44. The method of any one of clauses 1-27, wherein the first liquid comprises a single cell analysis reagent, wherein the second liquid comprises a single cell and a lysing reagent or contents from a single lysed cell, further comprising merging a first droplet and a second droplet and incubating the combined droplet under conditions effective for single cell analysis, wherein the method is a method of single cell analysis.
45. The method of any one of clauses 43-44, further comprising repeating the single cell analysis on ten or more single cells.
46. The method of any one of clauses 43-45, wherein the single cell analysis is genomic analysis.
47. The method of any one of clauses 43-45, wherein the single cell analysis is transcriptome analysis.
48. The method of any one of clauses 43-45, wherein the single cell analysis is proteomic analysis.
49. The method of any one of clauses 43-45, wherein the single cell analysis is metabolomic analysis.
50. The method of any one of clauses 1-27, wherein the first liquid comprises a nucleic acid conjugated to part of a drug candidate or to a whole drug candidate, further comprising assessing an interaction of the drug candidate with a biological target.
51. The method of clause 50, wherein the interaction is a binding assay.
52. The method of any one of clauses 50-51, wherein the nucleic acid is a DNA oligomer.
53. The method of any one of clauses 50-52, wherein the biological target is a cell receptor.
54. The method of any one of clauses 50-53, wherein the drug candidate is a small molecule.
55. A system for generating droplets, comprising:
  a first liquid in a first container;
  a receiving liquid in a receiving container; and
  a liquid handling device comprising a tube and configured to:
    aspirate the first liquid into the tube through an opening in a lumen of the tube;
    position the opening over the receiving liquid; and
    eject the first liquid from the opening to generate a first plurality of droplets that contact the receiving liquid, wherein the first liquid and the receiving liquid are configured such that the plurality of droplets remain discrete and do not merge after contacting the receiving liquid.

56. The system of clause 55, further comprising a washing liquid in a washing container, wherein the liquid handling device is configured to wash the tube after the ejecting.
57. The system of any one of clauses 55-56, further comprising a second liquid in a second container, wherein the liquid handling device is configured to aspirate and eject the second liquid after washing the tube.
58. The system of any one of clauses 55-57, wherein each liquid being aspirated and ejected comprises water and the receiving liquid comprises oil.
59. The system of any one of clauses 55-57, wherein each liquid being aspirated and ejected comprises oil and the receiving liquid comprises water.
60. The system of any one of clauses 55-59, wherein the receiving liquid comprises a surfactant.
61. The system of clause 60, wherein the surfactant is a fluorosurfacant.
62. The system of any one of clauses 60-61, wherein the receiving liquid comprises 0.5% w/v or more of surfactant.
63. The system of any one of clauses 55-62, wherein the ejecting comprises applying an oscillating force to the ejected liquid, wherein each oscillation corresponds to a single droplet.
64. The system of any one of clauses 55-63, wherein the tube is part of a piezo-electric droplet generator.
65. The system of any one of clauses 55-64, wherein the tube is part of a device that can also deposit droplets onto a solid substrate in an addressable manner.
66. The system of any one of clauses 55-65, further comprising an agitator that stirs, shakes, or otherwise agitates the receiving liquid.
67. The system of any one of clauses 55-66, wherein the droplets are generated at a rate of 50 Hz or more.
68. The system of clause 67, wherein the droplets are generated at a rate of 500 Hz or more.
69. The system of any one of clauses 55-68, wherein 95% or more of the droplets have a volume ranging from 10 pl to 2,000 pl.
70. The system of clause 69, wherein 95% or more of the droplets have a volume ranging from 50 pl to 1,000 pl.
71. The system of any one of clauses 55-70, wherein the opening of the tube has a cross-sectional area of 10 $mm^2$ or less.
72. The system of any one of clauses 55-71, wherein each aspiration step comprises aspirating 0.5 μl or more of liquid.
73. The system of any one of clauses 55-72, wherein 90% or more of the droplets have a diameter that is within 20% of the median droplet diameter.
74. The system of any one of clauses 55-73, wherein each aspirated liquid is present in a well plate before being aspirated.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., bp, base pair(s); kb, kilobase(s); pl, picoliter(s); s or sec, second(s); min, minute(s); h or hr, hour(s); aa, amino acid(s); nt, nucleotide(s); and the like.

Example 1

Commercial piezo-electric droplet printing, which normally prints onto solid substrates, can be instead used to make controlled emulsions by dispensing into an oil bath. Automated emulsification is accomplished using a three-step cycle repeated for each reagent (FIG. 1A). The tube nozzle of the printer moves to the wash tray, where residual sample from previous cycles is removed; this is an important step to minimize cross contamination. The nozzle moves to the sample plate, typically a 96 or 384 well plate containing the different solutions to be emulsified, loading the desired amount of reagent into the tube. These standard well plates are often used to store compound libraries. Finally, the nozzle moves above the oil bath, where it ejects droplets of reagent. The droplets pierce the oil layer and are coated by surfactant, pooling beneath the oil-air interface (FIG. 1B). The droplets are produced at 50-900 μL/hr depending on size and instrument settings, such that a library totaling ~5 mL can be created in ~5.5 h. Switching between samples adds instrument movement, tube wash, and sampling time of about 3 min per reagent. For example, a 1 mL library of 3.3 million 300 pL droplets comprising 10 reagents would take ~2.5 h to produce, while the same volume of 100 reagents would take ~7 h.

The SciFlexArrayer generates droplets on demand from static fluids maintained in the dispensing tube via actuation of piezo-electric driven pressure pulses (FIG. 2A). Initially, the tube is filled to the tip with the dispensing liquid; when the pulse is applied, a droplet bulges from the tip and detaches. The remaining liquid retracts up the tube before refilling and coming to rest at the tip, where the cycle can repeat. The ejected droplet continues forward due to its inertia, piercing the top of the oil and generating ripples traveling outward from the point of impact (FIG. 2B). Once in the oil, the droplet assumes a deformed shape due to viscous drag until its inertia is fully damped and it comes to rest, at which point it floats up due to its buoyancy.

When operating over an exactly repeating duty cycle, this mechanism generates droplets of identical size that are comparable to ones produced by a microfluidic device (FIG. 2D). Surfactants stabilize the droplets; if omitted, droplets can coalesce in the oil. It was found that 2% w/v fluorosurfactant prevents coalescence, even if droplets collide soon after entering the oil. Depending on droplet generation speed or water and oil composition, the surfactant may not stabilize the droplets before collision, which could lead to coalescence. Under such circumstances, surfactant, droplet, and oil composition are optimized to minimize coalescence. One approach is to lower the droplet generation rate to prevent sequential droplets from contacting before they are stable. For example, it was found that for water droplets generated at 500 Hz, monodispersity is high, but coalescence occurs at higher frequencies, resulting in polydispersity (FIG. 2E, left). It was observed that agitating the oil bath during printing by adding a stir bar reduces coalescence by reducing the chance that sequential droplets impact.

Since the minimum volume of an ejected droplet scales with tube diameter, smaller capillaries generate smaller droplets [19]. For a given tube size, droplet diameter can be varied by tuning pulse amplitude and width. Increasing amplitude at fixed pulse width yields a linear increase in droplet diameter (FIG. 2E, center). Increasing pulse width at fixed amplitude also yields a linear increase in droplet diameter (FIG. 2E, right). Thus, tuning both parameters and using different sized capillaries affords a wide range of controlled droplet diameters. This demonstrates that the SciFlexArrayer is an effective instrument for generating monodispersed emulsions of controlled size without microfluidics. Thus, it should be useful to labs interested in conducting monodispersed droplet reactions but lacking microfluidic expertise.

Figure 3:
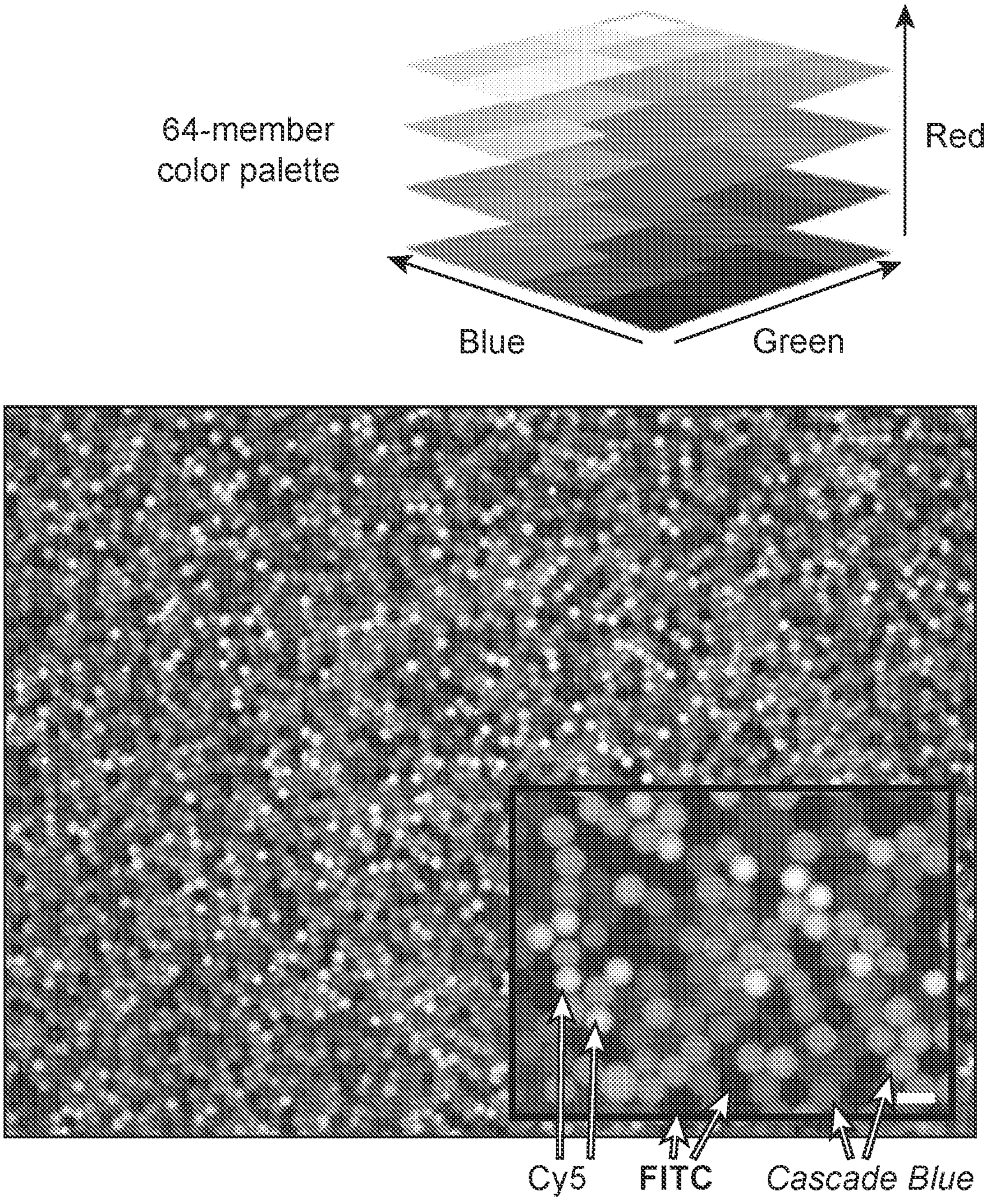
FIG. 3 shows emulsification of a large optically encoded library. (A) A 64-member color palette of all possible combinations of 4 levels of blue, green, and red dyes is emulsified with the printer. Scale bar=100 μm. (B) Based on images of the emulsion, brightness in the Cascade Blue (CB), FITC, and Cy5 channels is extracted from each droplet and visualized as a series of 2-D heatmaps. (C) To identify distinct droplet populations, drops are filtered and analyzed by T-distributed stochastic neighbor embedding (tSNE). The raw fluorescence data is overlaid on each analyzed droplet on the tSNE plot.
Figure 3:
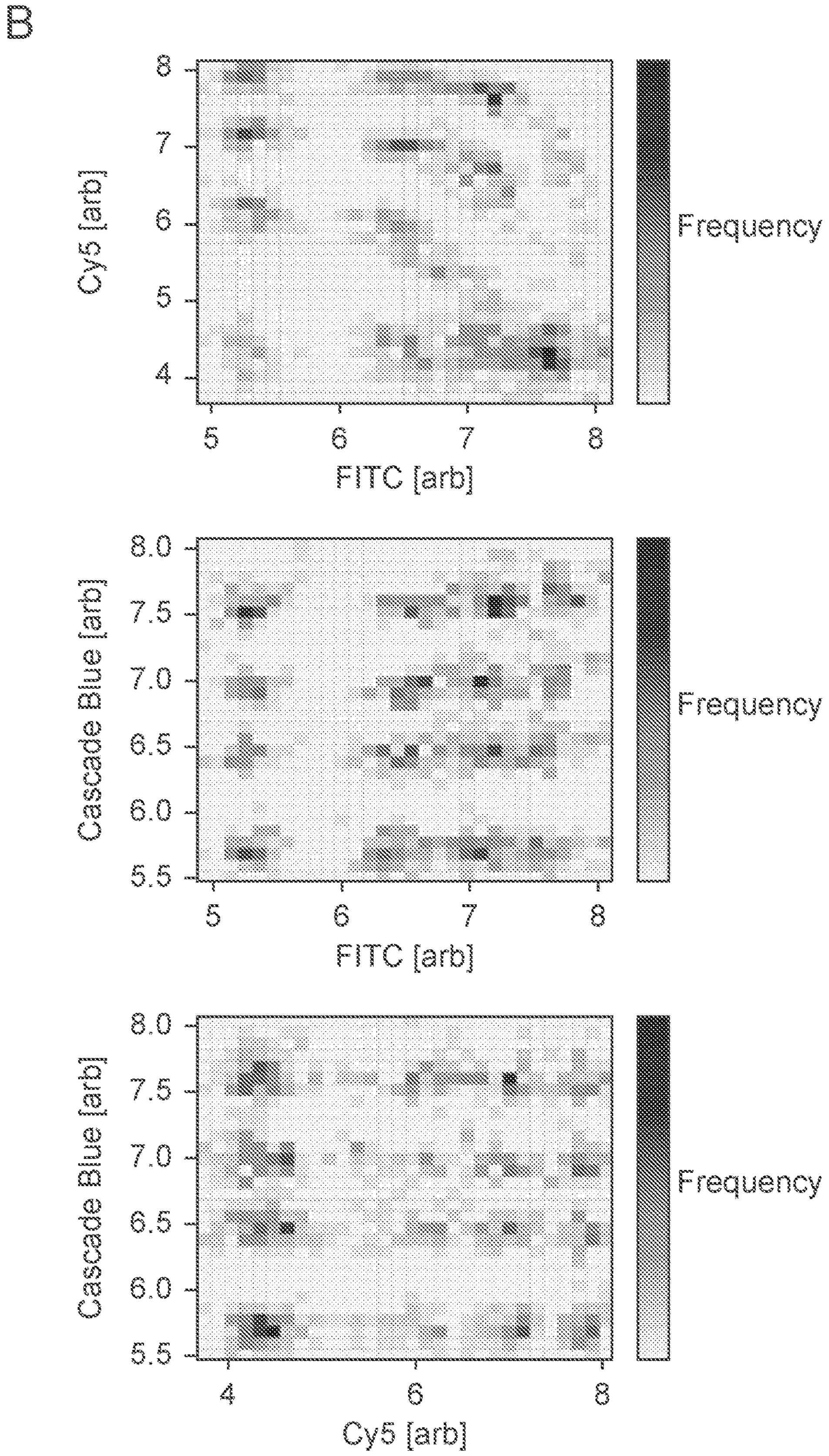
Figure 3:
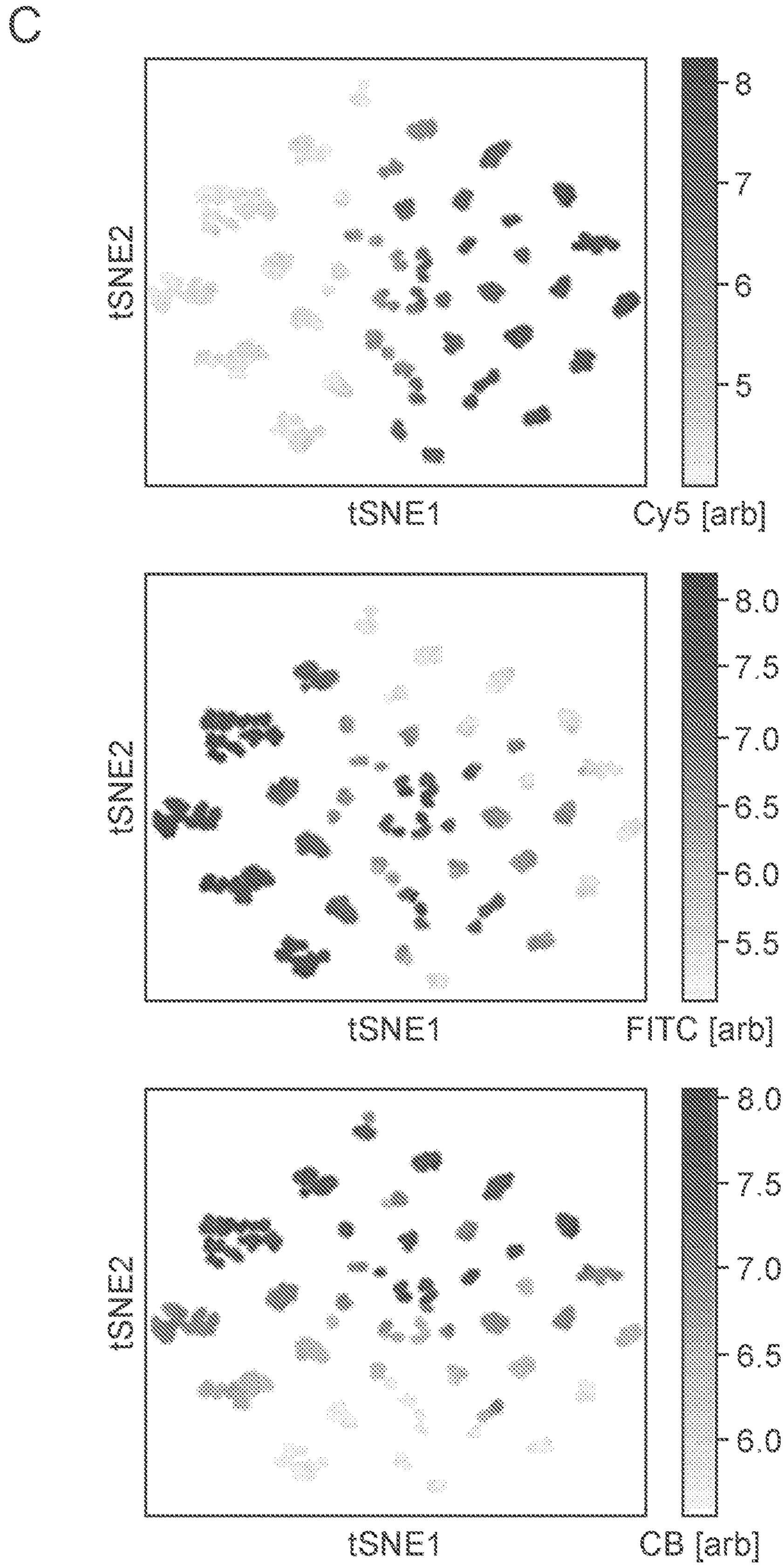

In addition to generating controlled emulsions, a major value of the SciFlexArrayer is its ability to emulsify solutions stored in well plates with full automation. To demonstrate this, a reagent set was constructed comprising 3 dyes at 4 concentrations, yielding 64 combinations (FIG. 3A, top). The constructed emulsion was imaged in 3 fluorescence channels (FIG. 3A, bottom). Intensity values were extracted from the center of each droplet and generate heatmaps (FIG. 3B). Histograms were generated for each of the fluorescence channels observing peaked distributions for all 4 dye concentrations. Due to crosstalk between FITC and Cy5, the distributions overlap for some droplets. To facilitate visualization of this 3D data, a dimensionality reduction was performed using T-distributed stochastic neighbor embedding (tSNE) [20], filtering out droplets that do not cluster at the expected dye concentrations, obtaining 54 clusters (FIG. 3C). The unresolved clusters result from low intensity droplets and cross talk between dyes, which become difficult to resolve by widefield fluorescence microscopy due to light variation at the periphery of the images (FIG. 3A). Overall, this library of ~2 mL total volume took ~4 h to generate from the well plate, demonstrating the effectiveness of this approach for transforming well plate libraries into droplet libraries suitable for microfluidic use.

Figure 4:
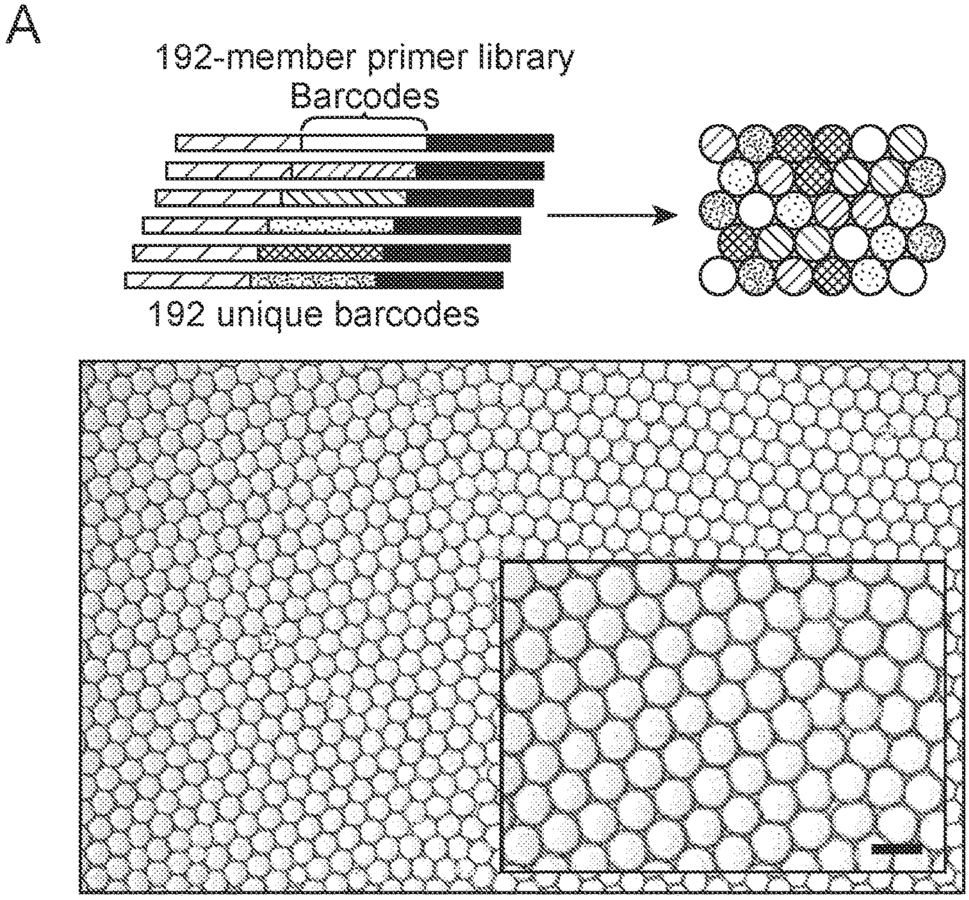
FIG. 4 shows amplification of oligonucleotides encapsulated within droplet libraries. (A) A library consisting of oligos consisting of one of 192 barcode sequences flanked by constant regions is encapsulated within droplets. (B) Histogram of the size distributions of droplets in the emulsion. (C) Encapsulated oligos are amplified by primers targeting the constant regions. DNA electropherogram confirms appropriately sized cDNA. (D) Micrographs of ΦX174 DNA co-encapsulated with digital droplet PCR reagents in brightfield and GFP channels for an emulsion without any ΦX174 DNA and where ΦX174 DNA is expected to be present in 30% of droplets. (E) Histogram of fluorescence intensity within droplets for the 30% positive emulsion. (F) Poisson estimator λ as a function of the percentage of positive droplets p, with an overlaid regression. All scale bars=100 μm.
Figure 4:
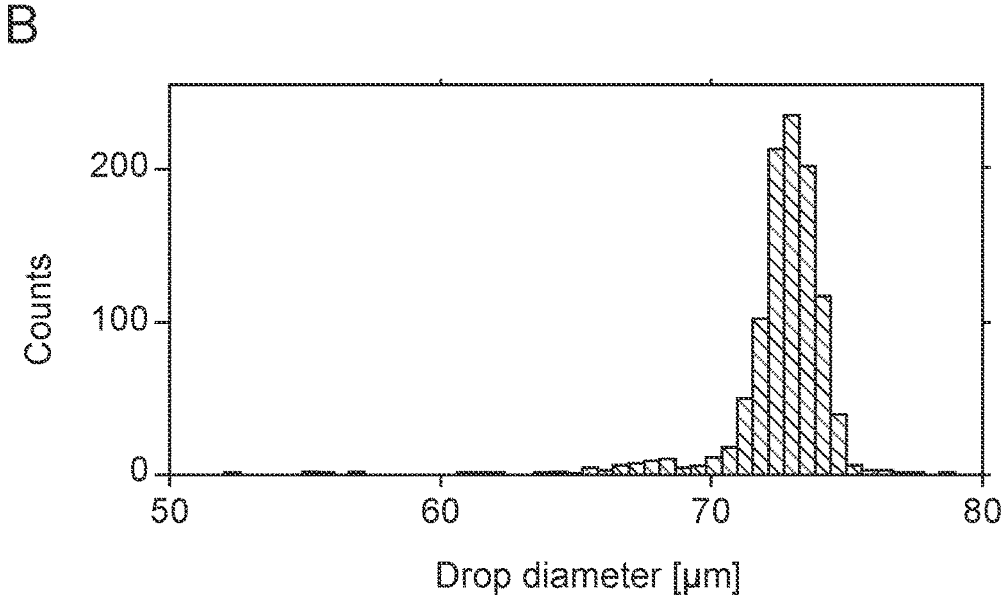
Figure 4:
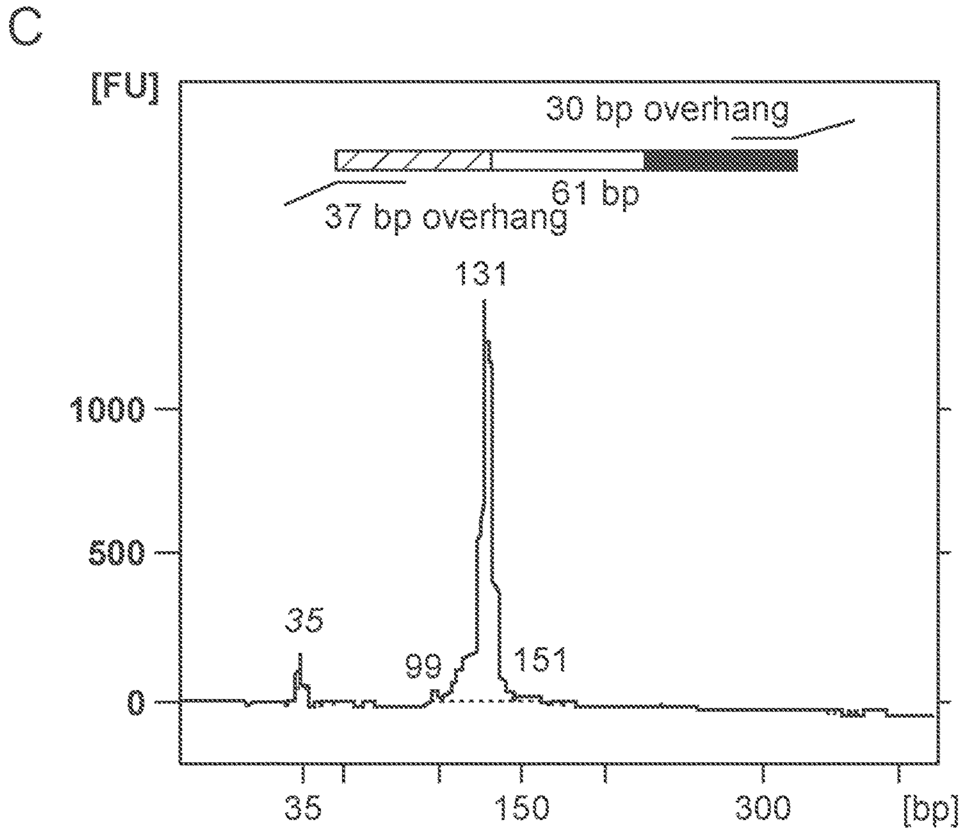
Figure 4:
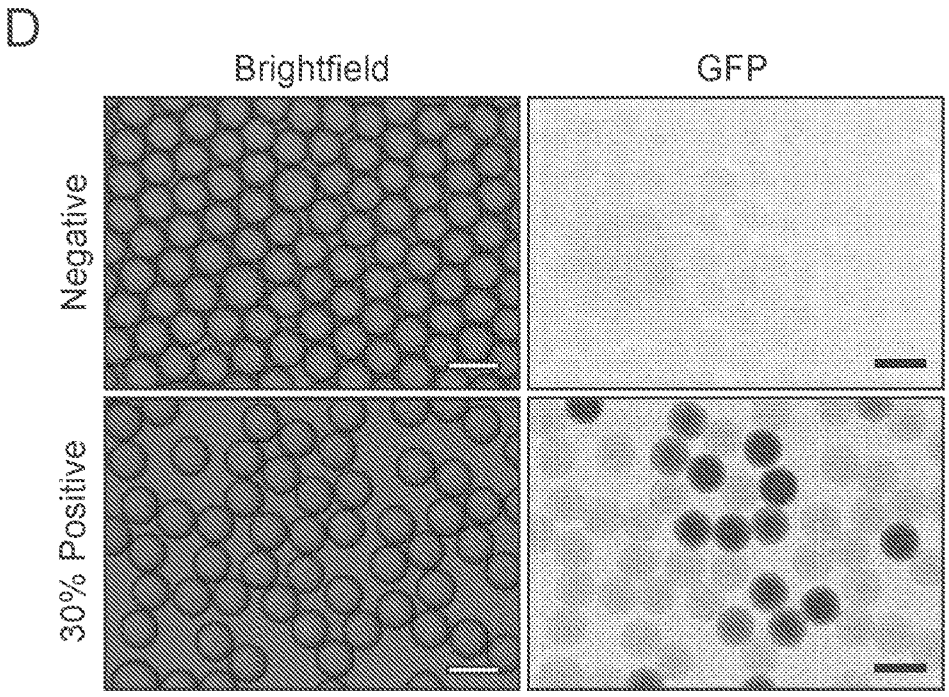
Figure 4:
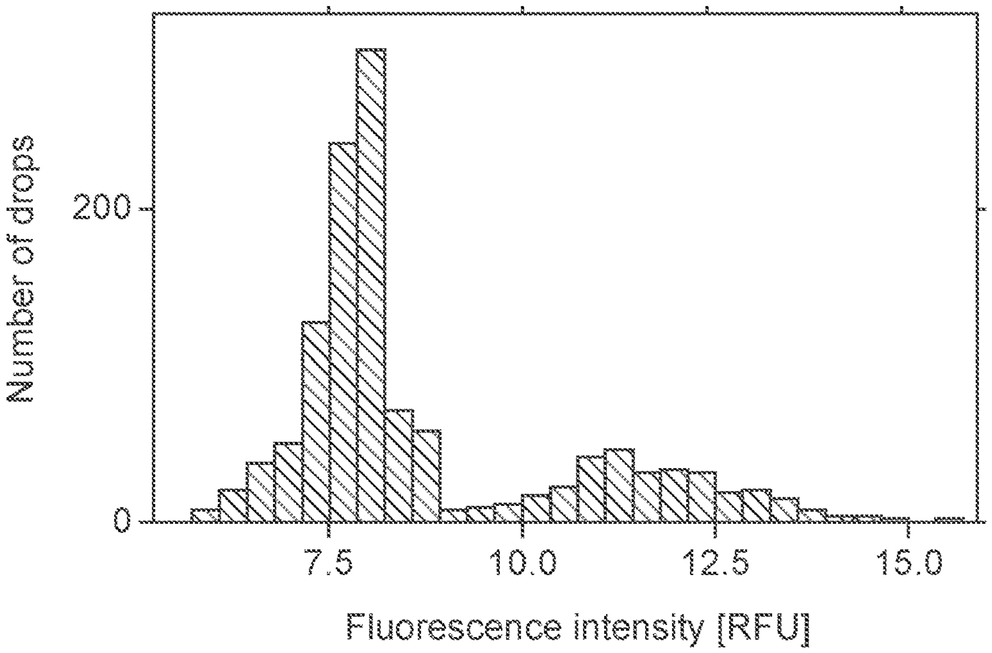
Figure 4:
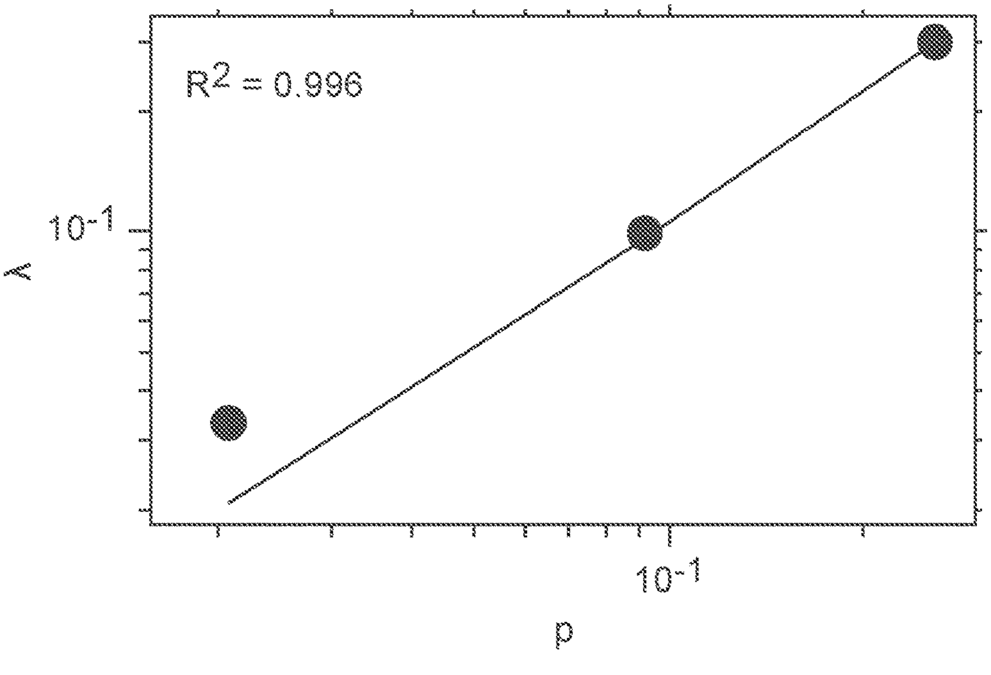

Encapsulating DNA in droplets is useful for a broad array of applications, including digital PCR, enzyme screening, and single cell sequencing [1, 8, 9]. To demonstrate the ability of the approach to generate oligo-containing droplet libraries that can be used for downstream assays, a library was generated including 192 unique primer sequences (FIG. 4A). The primer library consists of universal sequences flanking an 8-oligo barcode and is stored in a 384 well plate. With conventional microfluidic techniques, generating a 192-member droplet library would take over a day of round the clock operation with a single microfluidic device running at ~10 min per cycle, accounting for sample loading into syringes, startup of the device, and droplet generation, and would be wasteful of syringes, tubing, and labor. With this approach, this library was generated in ~8 h without any microfluidics or user intervention. The resulting emulsion is monodispersed, with a standard deviation of 3.3% (FIG. 4B). To confirm the library contains functional primers, the emulsions were broken and amplified the released barcodes, obtaining products of the expected size (FIG. 4C). This demonstrates that generation of a 192-member droplet library directly from a well plate is simple and effective and that the process does not harm the oligos.

The SciFlexArrayer functions as an automated droplet generator that, in principle, can perform any reaction compatible with well plate storage, sampling, and the emulsification mechanism. Thus, it affords an accessible means by which to conduct droplet assays without microfluidic instrumentation or expertise. To demonstrate this, the approach was used to perform digital droplet PCR, a ubiquitous and important application that normally requires specialized microfluidics [21]. As an example target, the ΦX174 virus was used, generating droplets at different concentrations to characterize dynamic range and accuracy. Compared to the negative control, fluorescent droplets were observed when the virus is present (FIG. 4D) obtaining a bimodal distribution corresponding to negative and positive droplets (FIG. 4E). Because the virus was loaded at limiting dilution, encapsulation follows Poisson statistics [22]. The Poisson estimator was used to relate the number of DNA molecules per droplet to the percentage of positive droplets (FIG. 4F) [23]. This shows that digital droplet PCR performed with the SciFlexArrayer behaves like reactions performed with conventional microfluidics. Moreover, it illustrates the promise of this approach for conducting droplet reactions without microfluidic expertise.

In summary, this shows a simple approach to generate diverse droplet libraries with full automation using a commercial liquid spotter. The instrument can encapsulate a sample to perform droplet reactions commonly requiring microfluidics. Thus, it should be useful for labs who want to conduct droplet reactions but lack microfluidic expertise. Moreover, its ability to precisely control the diameter of every formed droplet provides a unique opportunity for labeling reagents that can be used in combination with fluorescence tagging approaches [24, 25]. The ability to encapsulate large arrays of samples from well plates should make the approach useful as a tool for manufacturing reagents required for applications of droplet microfluidics, including droplet libraries for combinatorial chemistry applications or particle-templated droplet libraries for screening and single cell analysis [10, 23]. This approach makes monodispersed emulsification of hundreds of reagents simple and thus overcomes the major barrier to applying droplet microfluidics to applications requiring diverse reagent libraries.

Materials and Methods

Automated droplet library generation. A SciFlexArrayer S3 (Scienion AG) is used with either a PDC40, PDC70, or PDCX tube nozzle. Prior to printing, the tube is cleaned by exposing it to 1 mbar of oxygen plasma for 1 m in a plasma cleaner (Harrick Plasma). PBS from a source plate is aspirated into the tube and printed into 1 mL of HFE-7500 (3M) oil with 2% (w/v) PEG-PFPE amphiphilic block copolymer surfactant (RAN Biotechnologies). Droplet size as a function of acoustic wave parameters is measured at the time of printing by automated imaging processing by a camera mounted onto the SciFlexArrayer. Visualization of droplet generation is performed with a Miro R311 (Vision Research) high speed camera. Collected emulsions are pipetted onto a cell counting slide and visualized on the EVOS Cell Imaging System (Thermo Fisher) and monodispersity is calculated using ImageJ. For drop size distribution comparison, a microfluidic flow-focusing device with a cross-sectional channel dimension of 40 by 40 microns is used. Syringe pumps (New Era) are used to drive 1 mL syringes (BD) filled with HFE-7500 oil with 2% (w/v) PEG-PFPE amphiphilic block copolymer or PBS into the device at flow rates of 2000 μL/hr and 500 μL/hr, respectively.

Optically encoded 64-member droplet library generation. Dextran-Cascade Blue conjugate (Thermo Fisher), Dextran- Cy5 conjugate (Thermo Fisher), and Dextran-Fluorescein conjugate (Thermo Fisher) are diluted in PBS to the following 4 concentrations: 3 μM, 15 μM, 30 μM, and 60 μM. All possible combinations of these three dyes and concentrations are mixed individually into 64 wells on a 384 well plate. A print routine is set up with a PDC70 tube on the SciFlexArrayer to print 4000 drops of each mixture into 1 mL HFE-7500 oil with 5% (w/v) PEG-PFPE amphiphilic block copolymer in a 24-well plate. Collected emulsions are pipetted onto a cell counting slide and visualized on the EVOS Cell Imaging System using the DAPI, GFP, and Cy5 filter cubes (Thermo Fisher).

Fluorescence image analysis. A composite image of the three channels is cropped to include an 800-pixel diameter circle. Droplet size is analyzed and those droplets that are 2 standard deviations below the mean are excluded from downstream analyses. The intensity values at the center of each droplet in each channel is recorded. The intensity histograms for each of the 3 fluorescence channels is modeled as a mixture of 4 Gaussian distributions. Droplets with intensity values that are 1.5 standard deviation above or below the mean of the nearest Gaussian are filtered. tSNE clustering is performed with the sklearn Python package.

192-member primer droplet library. Custom oligonucleotides are ordered from IDT and kept at −20° C. until use. The 192-primer library consists of 96 sequences of the format CGGAGCTTTGCT AACGGTCGNNNNNNNNTCGTCGGCAGCGTCAGATGTATAAGAGACAG and 96 of the format CTTACGGATGTTGCACCAGNNNNNNNNGTCTCGTGGGCTCGGAGATGTG TATAAGAGACAG, where NNNNNNNN is a randomized 8 bp barcode that is a Hamming distance of at least 3 from all other barcodes. Each oligo is diluted to 5 μM in water and printed using a PDC70 into 1 mL HFE-7500 (3M) oil with 5% (w/v) PEG-PFPE amphiphilic block copolymer in a 24-well plate. A 2-mm diameter stir bar (V&P Scientific) is added into the well during printing. After printing, the collected emulsion is broken with an equal volume of 20% (v/v) perfluoro-1-octanol (Sigma-Aldrich) in HFE-7500. The emulsion is amplified using 1×KAPA HiFi HotStart ReadyMix (Roche) and 1 μM of forward primer and reverse primer (IDT). The thermocycling conditions are: 95° C. for 3 m; 8 cycles of 95° C. for 20 s, 60° C. for 30 s, 72° C. for 20 s; and a final extension of 5 m at 72° C. cDNA is purified using a 2× sample volume ratio of AMPure XP (Beckman Coulter) beads and analyzed on the Agilent 2100 Bioanalyzer.

Digital droplet PCR. PhiX-174 virion DNA (New England Biolabs) is mixed with PCR reagents containing 1× Platinum Multiplex PCR Master Mix (Life Technologies), 200 nM probe (IDT), 1 μM forward primer (IDT), 1 μM reverse primer (IDT), 0.5% (v/v) Tween 20 (Sigma-Aldrich), and 2.5% (w/v) Poly(ethylene glycol) 6000 (Sigma-Aldrich). The reaction mix is printed with a PDC70 tube into 100 μL HFE 7500 oil with 5% (w/v) PEG-PFPE amphiphilic block copolymer in a 0.2 mL PCR tube. After printing, the oil is replaced with 50 μL FC-40 oil (Sigma-Aldrich) with 5% (w/v) PEG-PFPE amphiphilic block copolymer. The emulsion is amplified using the following program on a Bio-Rad T100 thermocycler: 2 m 30 s at 95° C.; 35 cycles of 30 s at 95° C., 1 m 30 s at 60° C., and 30 s at 72° C.; and a final extension of 5 m at 72° C. The emulsion after thermocycling is imaged on the EVOS Cell Imaging System in brightfield and GFP channels. Intensity data is extracted from each droplet; coalesced droplets with a diameter greater than 80 μm were excluded from analysis. The Poisson estimator was calculated from the observed fraction of positive droplets by the following equation:

$$\lambda=-\ln(1-p) \quad [23].$$

REFERENCES

1. Hindson, B. J. et al., High-throughput droplet digital PCR system for absolute quantitation of DNA copy number. Analytical Chemistry 83 (22), 8604-8610 (2011).
2. Periyannan Rajeswari, P. K. et al., Multiple pathogen biomarker detection using an encoded bead array in droplet PCR. Journal of Microbiological Methods 139, 22-28 (2017).
3. Tang, M. Y. H. & Shum, H. C., One-step immunoassay of C-reactive protein using droplet microfluidics. Lab on a Chip 16 (22), 4359-4365 (2016).
4. Zheng, G. X. Y. et al., Massively parallel digital transcriptional profiling of single cells. Nature Communications 8 (1), 1-12 (2017).
5. Pellegrino, M. et al., High-throughput single-cell DNA sequencing of acute myeloid leukemia tumors with droplet microfluidics. Genome Research 28 (9), 1345-1352 (2018).
6. Sjostrom, S. L. et al., High-throughput screening for industrial enzyme production hosts by droplet microfluidics. Lab on a Chip 14 (4), 806-813 (2014).
7. Matula, K., Rivello, F. & Huck, W. T. S., Single-Cell Analysis Using Droplet Microfluidics. Advanced Biosystems 4 (1), 1900188 (2020).
8. Romero, P. A., Tran, T. M. & Abate, A. R., Dissecting enzyme function with microfluidic-based deep mutational scanning.
9. Macosko, E. Z. et al., Highly parallel genome-wide expression profiling of individual cells using nanoliter droplets. Cell 161 (5), 1202-1214 (2015).
10. Theberge, A. B. et al., Microfluidic platform for combinatorial synthesis in picolitre droplets. Lab on a Chip 12 (7), 1320-1326 (2012).
11. Kulesa, A., Kehe, J., Hurtado, J. E., Tawde, P. & Blainey, P. C., Combinatorial drug discovery in nanoliter droplets. Proceedings of the National Academy of Sciences of the United States of America 115 (26), 6685-6690 (2018).
12. Bronzes, E. et al., Droplet microfluidic technology for single-cell high-throughput screening. Proceedings of the National Academy of Sciences of the United States of America 106 (34), 14195-14200 (2009).
13. Kaminski, T. S., Jakiela, S., Czekalska, M. A., Postek, W. & Garstecki, P., Automated generation of libraries of nL droplets. Lab on a Chip 12 (20), 3995-4002 (2012).
14. Longwell, S. A. & Fordyce, P. M., micrIO: an open-source autosampler and fraction collector for automated microfluidic input-output. Lab on a Chip 20 (1), 93-106 (2020).
15. Ji, X. H. et al., Integrated parallel microfluidic device for simultaneous preparation of multiplex optical-encoded microbeads with distinct quantum dot barcodes. Journal of Materials Chemistry 21 (35), 13380-13387 (2011).
16. Jeong, H. H., Yelleswarapu, V. R., Yadavali, S., Issadore, D. & Lee, D., Kilo-scale droplet generation in three-dimensional monolithic elastomer device (3D MED). Lab on a Chip 15 (23), 4387-4392 (2015).

17. Fox, C. B. et al., Picoliter-volume inkjet printing into planar microdevice reservoirs for low-waste, high-capacity drug loading. Bioengineering & Translational Medicine 2 (1), 9-16 (2017).

18. Kirk, J. T. et al., Multiplexed inkjet functionalization of silicon photonic biosensors. Lab on a Chip 11 (7), 1372-1377 (2011).

19. Zhang, D. F. & Stone, H. A., Drop formation in viscous flows at a vertical tube tube. Physics of Fluids 9, 2234 (1997).

20. Maaten, L. v. d. & Hinton, G., Visualizing Data using t-SNE. Journal of Machine Learning Research 9 (Nov), 2579-2605 (2008).

21. Pinheiro, L. B. et al., Evaluation of a droplet digital polymerase chain reaction format for DNA copy number quantification. Analytical Chemistry 84 (2), 1003-1011 (2012).

22. Majumdar, N., Banerjee, S., Pallas, M., Wessel, T. & Hegerich, P., Poisson Plus Quantification for Digital PCR Systems. Scientific Reports 7 (1), 1-10 (2017).

23. Hatori, M. N., Kim, S. C. & Abate, A. R., Particle-Templated Emulsification for Microfluidics-Free Digital Biology. Analytical Chemistry 90 (16), 9813-9820 (2018).

24. Li, W. et al., Simultaneous generation of droplets with different dimensions in parallel integrated microfluidic droplet generators. Soft Matter 4 (2), 258 (2008).

25. Schmid, L. & Franke, T., Acoustic modulation of droplet size in a T-junction. Applied Physics Letters 104 (13), 133501 (2014).

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method of generating droplets, comprising:

aspirating a first liquid into a lumen of a tube through an opening in the tube, wherein the tube is part of a piezo-electric droplet generator;

positioning the opening over a receiving liquid;

ejecting the first liquid from the opening to generate a first plurality of droplets that contacts the receiving liquid, wherein the first plurality of droplets and the second plurality of droplets remain discrete and 50% or more of the first plurality of droplets do not merge after contacting the receiving liquid;

washing the tube with a washing liquid;

aspirating a second liquid into the tube through the opening;

positioning the opening over the receiving liquid; and ejecting the second liquid from the opening to generate a second plurality of droplets that contacts the receiving liquid thus creating a library comprised of the first plurality of droplets and the second plurality of droplets, wherein the second plurality of droplets remain discrete and 50% or more of the second plurality of droplets do not merge after contacting the receiving liquid.

2. The method of claim 1, repeating the aspirating, positioning, and ejecting steps for a total of 5 or more liquids and optionally for a total of 10 or more liquids.

3. The method of claim 1, wherein each liquid being aspirated and ejected comprises water and the receiving liquid comprises oil or wherein each liquid being aspirated and ejected comprises oil and the receiving liquid comprises water.

4. The method of claim 1, wherein the receiving liquid comprises a surfactant, wherein the surfactant is optionally a fluorosurfactant, and wherein the receiving liquid optionally comprises 0.5% w/v or more of the surfactant.

5. The method of claim 1, further comprising stirring or agitating the receiving liquid during each ejecting step, optionally wherein the ejecting comprises applying an oscillating force to the ejected liquid, wherein each oscillation corresponds to a single droplet, and optionally wherein the droplets are generated at a rate of 50 Hz or more and optionally at a rate of 500 Hz or more.

6. The method of claim 1, wherein the opening of the tube has a cross-sectional area of 100 $mm^2$ or less.

7. The method of claim 1, further comprising fluorescently tagging or barcoding the generated droplets.

8. The method of claim 1, wherein 95% or more of the droplets have a volume ranging from 10 pl to 2,000 pl.

9. The method of claim 1, wherein a total of 100 or more droplets are generated, and optionally wherein a total of 10,000 or more droplets are generated.

10. The method of claim 1, wherein 90% or more of the droplets do not combine with another droplet after contacting the receiving liquid, and optionally wherein 90% or more of the droplets have a volume that is within 20% of the median droplet volume.

11. The method of claim 1, wherein each aspirated liquid is present in a well plate before being aspirated and/or is part of a pool of liquid having a volume of 100 μl or more and/or wherein each aspiration step comprises aspirating 0.5 μl or more of liquid.

12. The method of claim 1, wherein the first liquid comprises a nucleic acid and a polymerase chain reaction (PCR) reagent, further comprising incubating a first droplet under conditions effective for the formation of a PCR amplification product from the nucleic acid, wherein the method is a method of performing digital PCR; or wherein the first liquid comprises a nucleic acid and the second liquid comprises a PCR reagent, further comprising merging a first droplet with a second droplet to form a combined droplet and incubating the combined droplet under conditions effective for the formation of a PCR amplification product from the nucleic acid, wherein the method is a method of performing digital PCR.

13. The method of claim 12, further comprising repeating the digital PCR on ten nucleic acids present in ten different liquids and optionally wherein the PCR reagent is a barcoded or fluorescently labelled primer.

14. The method of claim 1, wherein the first liquid comprises a nucleic acid and a multiple displacement amplification (MDA) reagent, further comprising incubating the first plurality of droplets under conditions effective for the formation of MDA amplification products from the nucleic acid, wherein the method is a method of performing digital MDA, or wherein the first liquid comprises a nucleic acid and the second liquid comprises a MDA reagent, further comprising merging a first droplet with a second droplet to form a combined droplet and incubating the combined droplet under conditions effective for the formation of MDA amplification products from the nucleic acid, wherein the method is a method of performing digital MDA.

15. The method of claim 14, further comprising repeating the digital MDA on ten nucleic acids present in ten different liquids and optionally wherein the MDA reagent is a barcoded or fluorescently labelled primer.

16. The method of claim 1, wherein the first liquid comprises a substrate and an enzyme hypothesized to be able to metabolize the substrate, further comprising incubating the first plurality of droplets under conditions hypothesized to be effective for metabolism of the substrate, wherein the method is a method of enzyme screening, or wherein the first liquid comprises a substrate and the second liquid comprises an enzyme hypothesized to be able to metabolize the substrate, further comprising merging a first droplet with a second droplet to form a combined droplet and incubating the combined droplet under conditions hypothesized to be effective for metabolism of the substrate, wherein the method is a method of enzyme screening.

17. The method of claim 1, wherein the first liquid comprises a single cell analysis reagent, wherein the first liquid further comprises a single cell and a lysing reagent or contents from a single lysed cell, further comprising incubating the first plurality of droplets under conditions effective for single cell analysis, wherein the method is a method of single cell analysis, or wherein the first liquid comprises a single cell analysis reagent, wherein the second liquid comprises a single cell and a lysing reagent or contents from a single lysed cell, further comprising merging a first droplet and a second droplet to form a combined droplet and incubating the combined droplet under conditions effective for single cell analysis, wherein the method is a method of single cell analysis.

18. The method of claim 17, wherein the single cell analysis is selected from genomic analysis, transcriptome analysis, proteomic analysis, and metabolomic analysis.

19. The method of claim 1, wherein the first liquid comprises a nucleic acid conjugated to part of a drug candidate or to a whole drug candidate, further comprising assessing an interaction of the drug candidate with a biological target, wherein optionally the interaction is a binding assay, wherein optionally the nucleic acid is a DNA oligomer, wherein optionally the biological target is a cell receptor, and wherein optionally the drug candidate is a small molecule.

* * * * *